United States Patent [19]
Hirikawa et al.

[11] Patent Number: 5,439,415
[45] Date of Patent: Aug. 8, 1995

[54] ROLLING STOCK VENTILATOR AND ITS CONTROL METHOD

[75] Inventors: Haruo Hirikawa, Kudamatsu; Shinichiroo Ishikawa, Tokuyama; Sumio Okuno, Kudamatsu; Morishige Hattori, Kudamatsu; Masakazu Matsumoto, Kudamatsu, all of Japan

[73] Assignee: Hitachi, Ltd., Tokyo, Japan

[21] Appl. No.: 202,467

[22] Filed: Feb. 28, 1994

[51] Int. Cl.⁶ .............................................. B61D 27/00
[52] U.S. Cl. ........................................ 454/70; 454/99; 454/105
[58] Field of Search ............................ 454/70, 99, 105

[56] References Cited

U.S. PATENT DOCUMENTS

| | | | |
|---|---|---|---|
| 5,137,490 | 8/1992 | Ishikawa et al. | 454/105 X |
| 5,263,894 | 11/1993 | Hirakawa et al. | 454/105 |

FOREIGN PATENT DOCUMENTS

| | | | |
|---|---|---|---|
| 498554 | 8/1992 | European Pat. Off. | 454/105 |
| 579536 | 1/1994 | European Pat. Off. | 454/105 |
| 315365 | 12/1988 | Japan | 454/70 |
| 258654 | 11/1991 | Japan | 454/70 |
| 178207 | 7/1993 | Japan | 454/105 |

*Primary Examiner*—Harold Joyce
*Attorney, Agent, or Firm*—Antonelli, Terry, Stout & Kraus

[57] ABSTRACT

A rolling stock ventilator including an air supply fan, an exhaust fan an inverter for changing air feed characteristics of the air supply fan and the exhaust fan. Flow path resistance changers, a tunnel detector to detect the presence of a tunnel, and a car internal pressure detector are also provided. A controller provides signals to the inverters and the flow path resistance changers with the signals representing a control command to change the operation frequency of the air supply fan and the exhaust fan in accordance with the result of a detection by the tunnel detector and the car internal pressure detector and also provides a control command to change the air feed resistance of the flow path resistance changers.

13 Claims, 14 Drawing Sheets

ROLLING STOCK VENTILATOR AND ITS CONTROL METHOD

BACKGROUND OF THE INVENTION

The present invention relates to a rolling stock ventilator and a ventilator control method, and more particularly to a rolling stock ventilator and control method suitable for railway rolling stock running through the tunnel, at the speed of above 200 km/h.

When railway rolling stock enters a tunnel at a high speed, a pressure inside the tunnel is greatly changed by essentially a piston action of the car, causing the car be subjected to a sudden pressure change. Thus, an imbalance occurs to the air feed volume of the ventilator air supply fan due to the change of the car external pressure, and causing the car internal pressure to be changed. This raises a problem of giving an unpleasant feeling to the passengers.

In, for example, Japanese Laid Open Patent Publication 1-168560 (1989) or U.S. Pat. No. 5,137,490 proposes to solve the above problems by providing a ventilator which increases the air feed volume by raising the air feed characteristics of an air supply fan and exhaust fan and an by reducing the flow path resistance of the flow path resistance changer, when the inclination or tendency of the car external pressure change and the absolute value of the car external pressure change have reached the value corresponding to the unpleasant feeling of the passenger.

The unpleasant feeling given to the passengers by car internal pressure change is determined by the absolute value of the car external pressure change and the inclination of the pressure change. Thus, even if the volume of the air is increased by raising the air feed characteristics of the air supply fan and exhaust fan are changed according to the degree of the car internal pressure change, and by decreasing the flow path resistance of the flow path resistance changer, the absolute value of the imbalance in the air feed volume of the air supply fan and exhaust fan is almost the same as before the air feed volume is increased. The car internal pressure changes independence upon the degree of imbalance between the supply air and exhaust air volumes. On the other hand, the range of the pressure change inside the tunnel when the car is running through the tunnel is increased in proportion to the second power of the speed of the railway rolling stock. If the car speed is increased, imbalance in the air feed volume of the air supply fan and exhaust fan is also increased, so that the car internal pressure change will exceed the tolerance, giving unpleasant feeling to the passengers.

SUMMARY OF THE INVENTION

The object of the present invention is to provide a rolling stock ventilator to permit reduction of the unpleasant feeling of the passengers when the car is running through the tunnel.

Another object of the present invention is to provide a control method for the rolling stock ventilator which reduces the unpleasant feeling of the passengers, by operating the ventilator accurately in conformity to the car running through the tunnel.

The present invention increases the air pressure of the air supply fan and exhaust fan and raises the air flow path resistance which is connected to the air supply fan and exhaust fan, when the car enters the tunnel. This is intended to reduce the imbalance in the air feed volume of the air supply fan and exhaust fan caused by changes in the car internal pressure while the car is passing through the tunnel, thereby mitigating the unpleasant feeling of the passengers.

Another feature of the present invention is to raise the air feed pressure of the air supply fan and exhaust fan and to increase the resistance of the air flow path connected to the air supply fan and exhaust fan, before the car enters the tunnel. This ensures reliable operation of the ventilator when the tunnel enters the tunnel.

DETAILED DESCRIPTION

Figure 1:
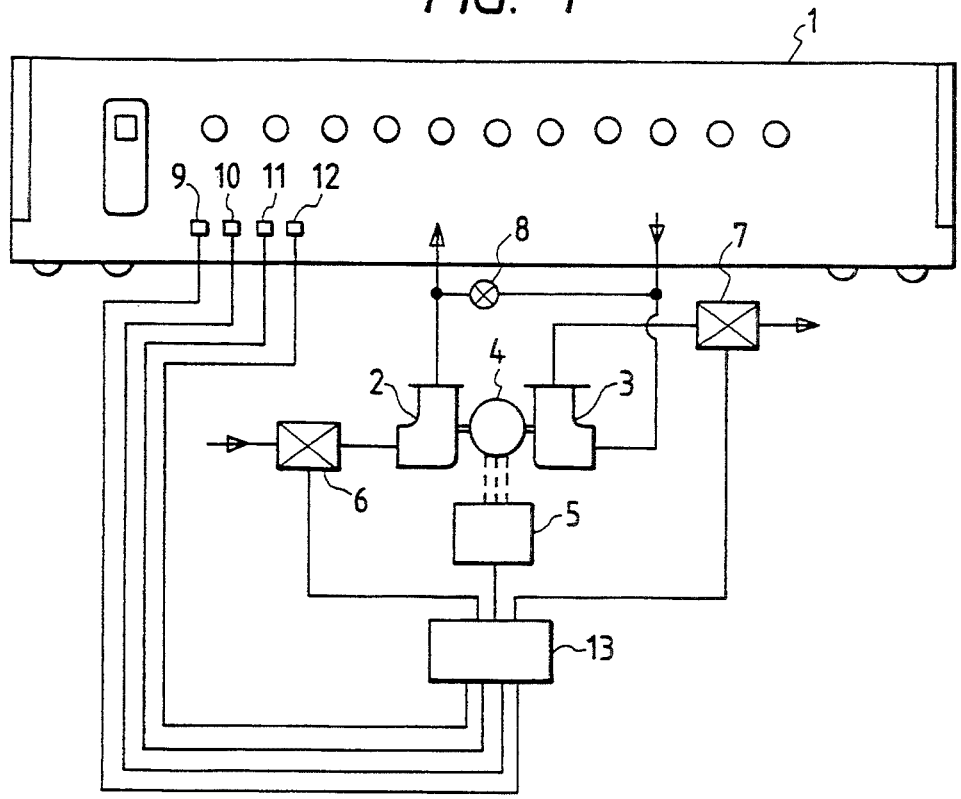
FIG. 1 is a schematic view of an air passage and component parts of the rolling stock ventilator in accordance with the present invention.
Figure 2:
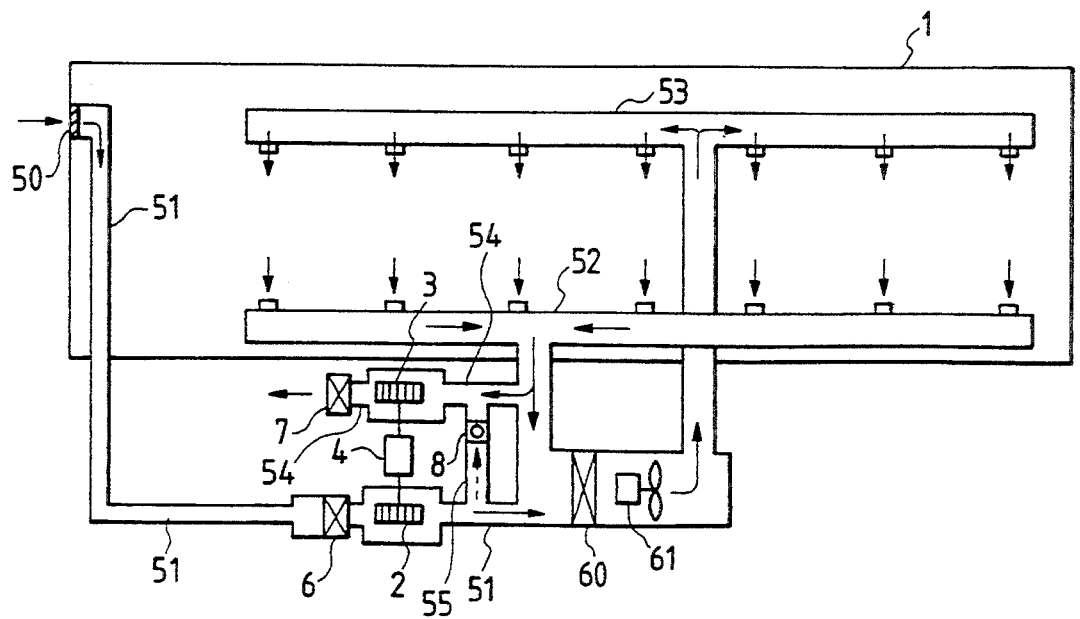
FIG. 2 is a schematic view of a ventilation duct passage of the rolling stock ventilator of FIG. 1 and the air conditioning duct passage of the air conditioner.

Referring to FIGS. 1 and 2, a ventilator according to the present invention is normally mounted below a flow of the car 1, with the ventilator being provided with an air supply fan 2 which takes in or draws fresh air into the car and an exhaust fan 3 for discharging old or stale air from the car. The air supply fan 2 and the exhaust fan 3 are driven by a motor 4 provided with oppositely disposed drive shafts. The motor 4 is controlled by an inverter 5, with the inverter 5 supplying electric power to the motor 4 and controlling the operation frequency. A flow path resistance changer 6 is provided upstream of the air supply fan 2 on a ventilator duct 51 (FIG. 2) connected to the air supply fan 2. A flow path resistance changer 7 is provided downstream of the exhaust fan 3 on a ventilator duct 54 connected to the exhaust fan 3. The portion downstream of the air supply fan 2 on the ventilator duct 51, connected to the air supply fan 2, and the portion upstream of the exhaust fan 3, on the ventilator duct 54 connected to the exhaust fan 3, are connected by a bypass circuit 55 provided with a release valve 8. The ventilator duct 51, connected to the air supply fan 2 on the exhaust side, is connected to the air flow path where an indoor heat exchanger 60 and an indoor fan 61 are installed. Air passing through the indoor heat exchanger 60 is fed into the car 1 by an indoor fan 61 through an air conditioner duct 53.

Air in the car 1 is led to the air conditioner by a return duct 52 linked to the air conditioner. The ventilator duct 54 is connected midway along the return duct 52 and part of the air led into the air conditioner is fed to the exhaust fan 3 to be discharged Out of the car. The air volumes of the air supply fan 2 and the exhaust fan 3 are equal to each other so as to provide continuous ventilation while maintaining the pressure in the car at a constant value. The air supply fan 2 and the exhaust fan 3 are designed to have the maximum capacity providing greater pressure than that of changes in car internal pressure during running through a tunnel. The car body constituting the car 1 is designed in an air-tight structure within the practical range.

A tunnel detector 9 detects the car 1 entering the tunnel during the travel. The tunnel detector a includes a traveling point detector for detecting the position on the line of the car 1 by detecting the fixed point detecting means installed on the track, a memory means for storing the information on the tunnel position and length on the line, a distance meter for detecting the traveling distance of the car 1, and a calculator which sends output signals by predicting the time of the car 1 entering the tunnel according to the information given by the traveling point detector, the memory means and the distance meter. The tunnel detector 9 predicts the time of the car 1 entering the tunnel and sends output signals to a controller 13. A car internal pressure detector 10 transmits information signal on the pressure inside the oar 1 to the controller 13.

The car internal pressure detector 10 detects the pressure inside the car 1 and sends the information to the controller 13. An air conditioner operation mode detector 11 for detecting the operation mode of the air conditioner detects if the air conditioner is in the cooling mode or in the heating mode, and sends the result to the controller 13. A low voltage relay 12 detects the drop of voltage supplied to the ventilator when the car 1 has passed through a section of the tunnel, that is, a very short distance where the power supply is interrupted in the power feed system of the track. The controller 13 sends the control commands to the inverter 5, the flow path resistance changer 6, the flow path resistance changer 7 and the release valve 8, using the results of the four detectors as control input signals.

In FIG. 2, the fresh air outside the car suctioned through a grille 50 is fed to the flow path resistance changer 6 through the ventilator duct 51. After that, the fresh air is led from the air supply fan 2 to the indoor machine room where the indoor heat exchanger 60 and the indoor fan 61 are installed, and is fed into the car through the air conditioner duct 53 by the indoor fan 61. Part of the return air suctioned by the return duct 52 is mixed with the fresh air and passes through the indoor heat exchanger 60 of the air conditioner. The car is then supplied into the car through air conditioner duct 5S by the indoor fan 61. The remaining part of the return air is discharged from below the floor of the car by the exhaust fan 3 through the ventilator duct 54 and the flow path resistance changer 7.

As shown in FIGS. 3 to 7, flow path resistance changers 6 and 7 are formed into part of the steel duct with a rectangular section having a specified length. This duct is provided with an opening 101 on the upstream side and with an opening 102 on the downstream side. A metallic drift plate 20 is fixed to the duct near the opening 101 so as to close about half of the ventilation passage of the duct. Two check plates 21a and 21b, disposed on the downstream side are provided in such a direction so as to extending transversely of the duct, and with the two openings (large and small) which let the air pass. Stopper plates 22a and 22b are guided by guides 23a and 23b, and are disposed so as to extend transversely of the duct. The stopper plates 22a, 22b are installed to permit reciprocal movement inside the ventilation passage.

The stopper plate 22a is provided to close either of the two openings (large and small) of the check plate 21a at all times, while the stopper plate 22b is provided to close either of the two openings (large and small) of the check plate 21b at all times.

The reciprocal movement of the stopper plates 22a and 22b is achieved by expansion and contraction of air cylinders 24a and 24b. The air cylinders 12a and 24b are mounted on the small openings of the check plates 21a and 21b through brackets 25a and 25b.

The rods of air cylinders 24a and 24b are fixed to logs 26a and 26b mounted on stopper plates 22a and 22b in order to enable a closing of large openings of check plates 21a and 21b when the rode are expanded. The check plates 21a and 21b and stopper plates 22a and 22b constitute flow path restriction means 19 which reduces the air path area.

Flow path resistance changers 6 and 7 can change the ventilation resistance in four stages shown in FIGS. 4 to 7. The area of large opening R0 of check plate 21a is the same as that of check plate 21b, and is set to about 25% of the air flow path area of the duct, whereas, the area of small opening S1 of check plate 21b is set to about 5% of the air flow path area of the duct. Each of the opening areas depends on ventilation resistance.

Figure 4:
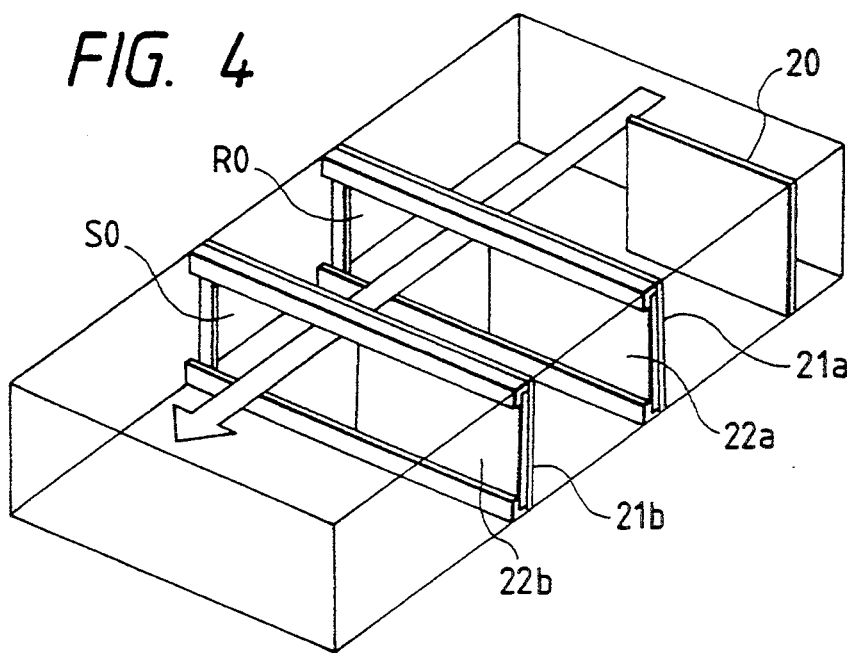
FIGS. 4–7 are schematic perspective views depicting an approximate operation of the flow path resistance change of FIG. 3.

In FIG. 4, air flows straight through large opening R0 of the check plate 21a and small opening S1 (FIG. 5) of the check plate 21b; Therefore, the ventilation resistance is minimized.

Figure 5:
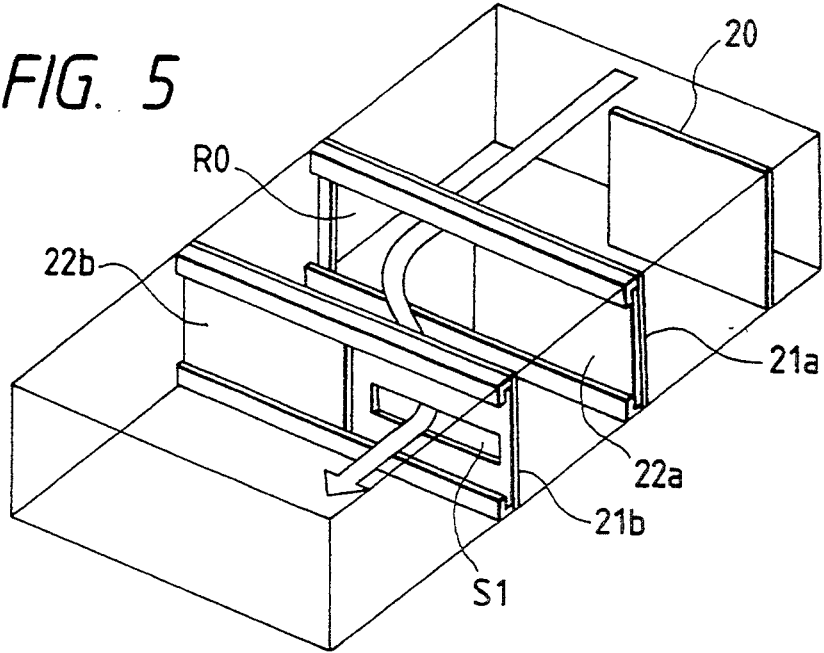

In FIG. 5, air flows through large opening R0 of the check plate 21a; after that, it changes the direction to pass through small opening S1 of the check plate 21b; therefore, the ventilation resistance is greater than that the ventilation arrangement FIG. 4.

Figure 6:
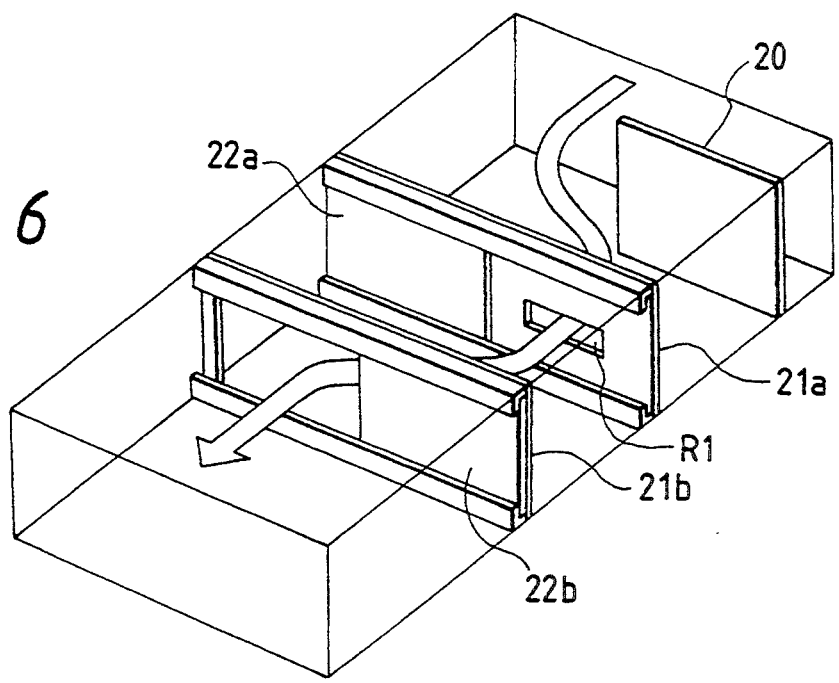

In FIG. 6, the direction of air is changed to the left by the drift plate 20, and air flows through small opening R1 of the check plate 21a. It again changes its direction to the right, and flows through large opening SO of the check plate 21b. Compared with FIG. 5 where air reduction is small, the ventilation resistance in FIG. 6 is greater than in the case of small reduction, because the resistance is increased by the change of direction caused by the drift plate 20 and by the area of small opening R1 being smaller than that of the small area S1.

Figure 7:
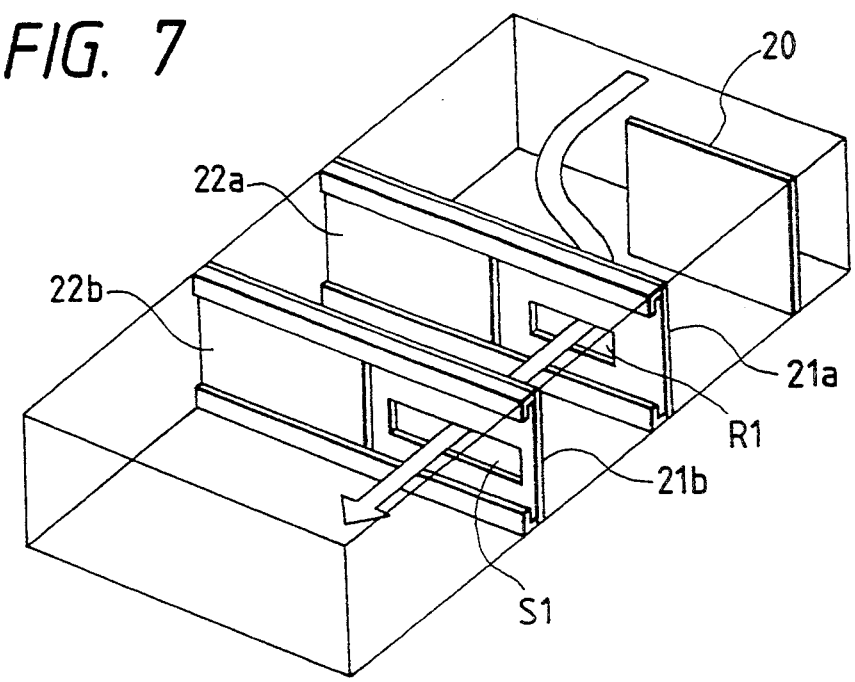

In FIG. 7, the direction of air is changed to the left by the drift plate 20, and air flows through two openings, namely, the small opening R1 of the check plate 21a and small opening S1 of the check plate 21b; therefore, the ventilation resistance is maximized.

The following describes the operation of flow path resistance changers 6 and 7. First it is assumed that the air conditioner is operating on the heating mode, and the car external pressure is considerably higher than the internal pressure. The volume of air passing through the air supply fan 2 is increased, while the volume of air passing through the exhaust fan 3 is decreased. As a result, car internal pressure rises. The car internal pressure data detected by the car internal pressure detector 10 is inputted into the controller 13. The controller 13 makes a stepwise selection of resistance characteristics of flow path resistance changers 6 and 7 in dependence upon the rise of the car internal pressure. Namely, as shown in FIGS. 4 to 7, four resistance characteristics can be chosen by selecting the large or small opening of the two check plates 21a and 21b as required. Outside the tunnel, both stopper plates 22a and 22b close the small openings R1 and S1 of check plates 21a and 21b while the large openings R0 and S0 are open, as shown in FIG. 4. Immediately before the car enters the tunnel, air supply characteristics of air supply fan 2 and exhaust fan 3 are increased by the inverter 5, and the state of the opening of the check plates 21a and 21b is changed into the state shown in FIG. 5, where the stopper plate 22a closes the small opening R1 of the check plate 21a, while the stopper plate 22b closes the large opening SO of the check plate 21b.

Since it is necessary to reduce the volume of air on the air supply side if the car internal pressure still increases, this state is further changed by the operation of the air cylinders 24a and 24b into the position illustrated in FIG. 6 where the stopper plate 22a closes the large opening R0 of the check plate 21a, while the stopper plate 22b closes the small opening S1 of the check plate 21b, then into the state illustrated in FIG. 7 where both stopper plates 22a and 22b close the large openings R0 and S0 of check plates 21a and 21b. This will reduce the difference between the volume of exhaust air reduced by the car internal pressure changing to the positive side and that of the supply air reduced by the flow path resistance changer. Furthermore, when reduction in the volume of supply air is greater than that in the exhaust side, the volume of the exhaust air will be greater, and abrupt rise of the car internal pressure will be converted into gradual pressure increase or decrease, or the pressure will return to the atmospheric level gradually.

Assume the cases where the car internal pressure is considerably lower than the external pressure. The volume of air passing through the air supply fan 2 will decrease, and the volume of air passing through the exhaust fan 3 will increase. As a result, the car internal pressure drops, making it necessary to reduce the volume of air on the exhaust side. To increase the flow resistance of flow path resistance changer 7 on the exhaust side, the state is changed into the state illustrated in FIGS. 6 and 7 by the air cylinders 24a and 24b. This will result in a small difference between the air volume of supply air and that of exhaust air. Depending on cases, the volume of supply air will be greater, and an abrupt drop of the car internal pressure is converted into a gradual pressure decrease or increase, or the pressure will return to the atmospheric level gradually.

Figure 8:
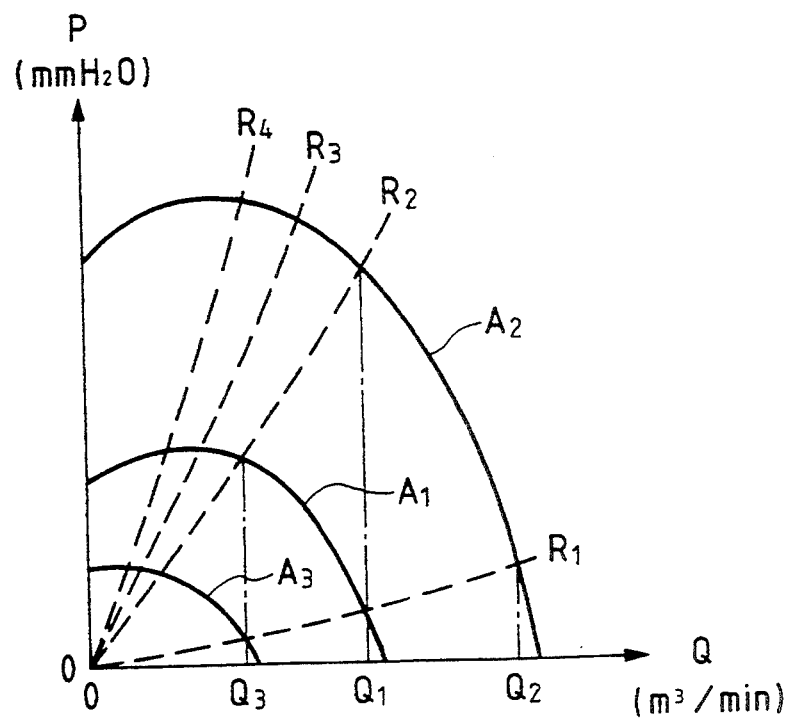
FIG. 8 is a graphical illustration depicting the air feed characteristics of the air supply fan and exhaust fan and the resistance characteristics of the flow path resistance changer, with the air feed volume Q plotted on the horizontal axis, and the static pressure P on the vertical axis.

FIG. 8 shows the relationship between the reduced condition in the flow path resistance changers and resistance characteristics. The resistance curve $R_1$ represents the fully open state shown in FIG. 4 where the resistance against air flow is the smallest, and the ventilator according to the present invention is set to the condition of $R_1$ when the car 1 runs through the tunnel. Resistance curve $R_2$ illustrates the case when the car 1 runs through the tunnel at the state shown in FIG. 5, where the resistance against air flow is considerably increased from the fully open state shown in FIG. 4. When the air feed pressure of air supply fan 2 and exhaust fan 3 is increased by the inverter 5, the initial state of resistance curve $R_2$ shown in FIG. 5 is selected in order to maintain the volume of air to rated volume $Q_1$. $R_3$ and $R_4$ represent the curves when the resistance against air flow has been increased from the state illustrated in FIG. 5; they are used in order to reduce the change in internal pressure when the imbalance in the volumes of supply air and exhaust air have been created by the change in car external pressure during the travel. The states of reduction in FIGS. 6 and 7 correspond to resistance curves $R_3$ and $R_4$, respectively. Air feed characteristics $A_1$ are the air supply characteristics of air supply fan 2 and exhaust fan 3 when the car 1 runs out of the tunnel, while air feed characteristics $A_2$ are air supply characteristics of air supply fan 2 and exhaust fan 3 when the car 1 runs through the tunnel. Air feed characteristics $A_3$ are air feed characteristics of air supply fan 2 and exhaust fan 3 when the car has passed by the section to stop the operation of the air conditioner. Namely, $A_1$ shows the air feed characteristics when the motors 4 driving the air supply fan 2 and exhaust fan 3 are operated at the standard frequency (e.g. 60 HZ). $A_2$ denotes the air feed characteristics when motors 4 of both air supply fan 2 and exhaust fan 3 are operated at the high frequency (e.g. 90 Hz) where the operation frequency is made higher than the standard frequency. $A_3$ indicates the characteristics when motors 4 of both air supply fan 2 and exhaust fan S are operated at the low frequency (e.g. 30 Hz) where the operation frequency is made higher than the standard frequency.

Figure 9:
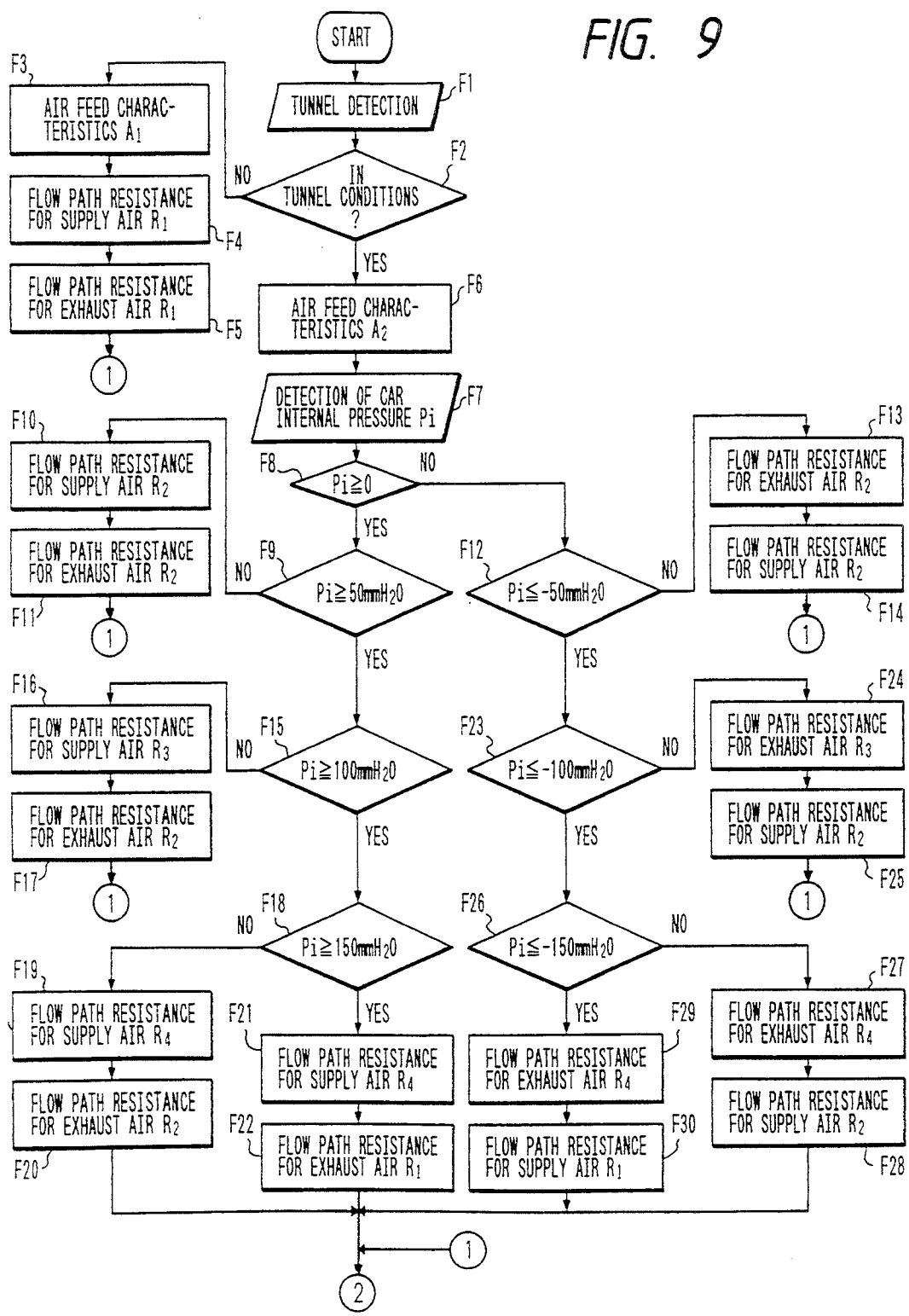
FIG. 9 is a control flow chart representing the air conditioner of the ventilator operating in a heating mode.
Figure 10:
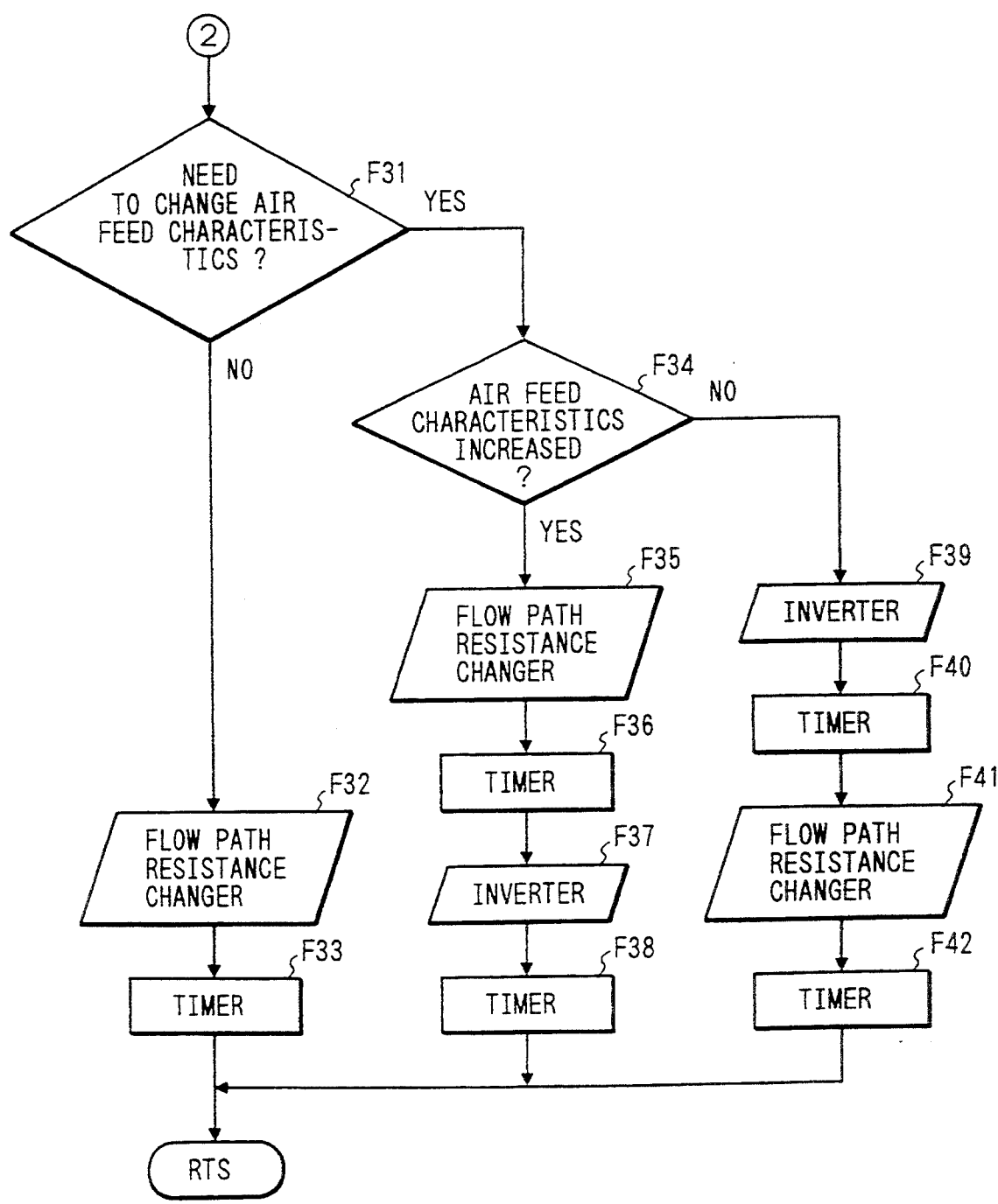
FIG. 10 is a continuation of the flow chart of FIG. 9.

The following describes the ventilator control flow when the air conditioner is operating in the heating mode according to FIGS. 9 and 10.

When the tunnel detector 9 has detected that the car 1 is running out of the tunnel, air feed characteristics of air supply fan 2 and exhaust fan 3 are $A_1$, normal characteristics of lower pressure, as shown in FIG. 8. In this case the flow path resistance of the air flow path including the flow path resistance changers 6 and 7 is equal to $R_1$. The balanced volume of air in this case is is $Q_1$ which is a rated volume of air.

The above description covers the control from F1 to F5 in FIG. 9.

When the tunnel detector 9 has predicted that the car 1 is entering the tunnel, the inverter 5 changes the air feed characteristics of air supply fan 2 and exhaust fan S to $A_2$. The controller 13 determines the flow path resistance of flow path resistance changers 6 and 7 according to the result of detection by the car internal pressure $P_1$. Since the car has not yet entered the tunnel, the car internal pressure is almost the same as atmospheric pressure, and the car internal pressure is less than 50 mmH$_2$O whether it is positive or negative. Therefore, check plates 21a and 21b of flow path resistance changers 6 and 7 are positioned as shown in FIG. 5, and the flow paths resistance becomes $R_2$ shown in FIG. 8. The above description covers the control from F6 to F14 in FIG. 9. The air volume of air supply fan 2 and exhaust fan 3 at this time is almost equal to the rated air volume $Q_1$.

Figure 11:
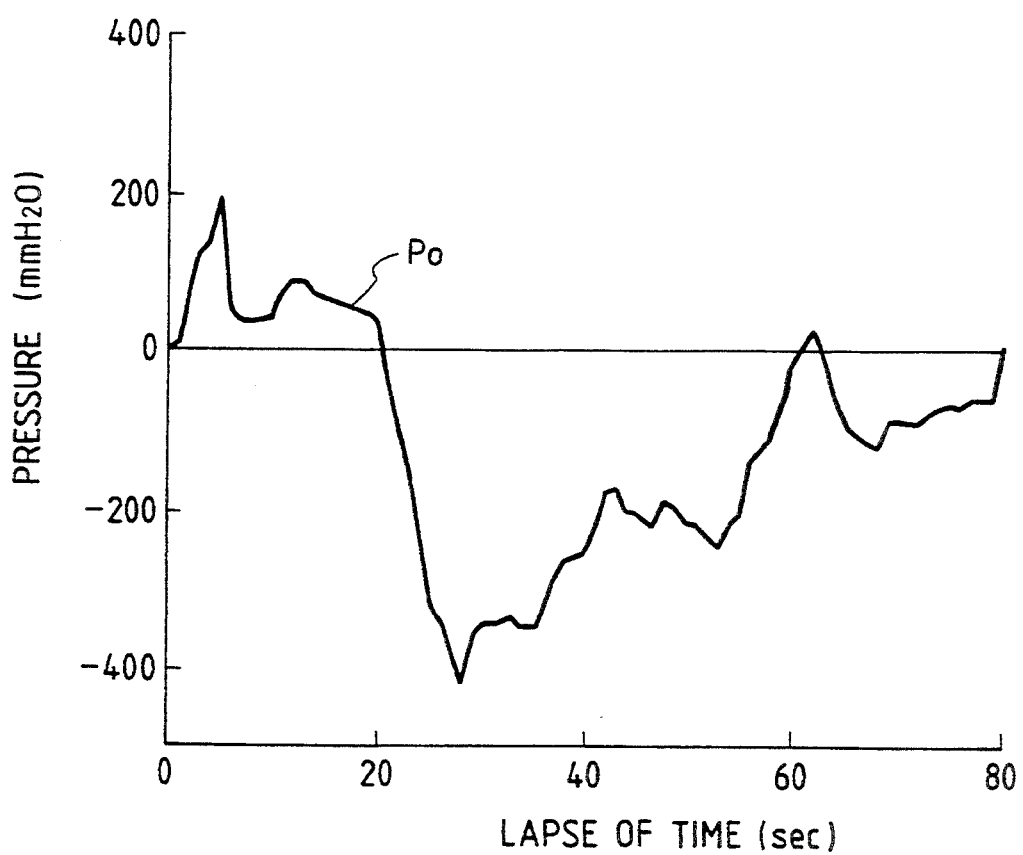
FIG. 11 is a graphical illustration showing the external pressure change of the car running through the tunnel, with the pressure change plotted on the vertical axis and a lapsed time on the horizontal axis.

If the car enters the tunnel under this condition, the car external pressure changes in the manner shown in FIG. 11, for example. FIG. 11 depicts the change of the car external pressure on the side of the leading car; and also illustrates the change of the car external pressure between the car entering and exiting the tunnel. When a car passes a car running in the opposite direction twenty seconds after the leading car entered the tunnel, the car external pressure $P_c$ is greatly changed. This causes imbalance between the volumes of air between the air supply fan 2 and the exhaust fan 3, producing a difference in air volumes and a change in the pressure inside the car.

As a result, if the car internal pressure has changed above 50 mmH$_2$O according to the judgments F9 and F15, the flow path resistance of the supply air is switched to $R_4$ of control state F19 according to judgments F15 and F18, reducing the volume of supply air still further. Finally, if the car internal pressure still exceeds 150 mmH$_2$O according to F18, the flow path resistance of the exhaust air is switched to flow path resistance $R_2$ Of control state F22 outside the tunnel, increasing the volume of exhaust air, so that the volume of air on the exhaust side is greater than that on the supply side, and the car internal pressure is reduced.

Namely, the flow pass resistance $R_4$ (control state F21) is determined so that the volume of exhaust air increased by minimizing the flow pass resistance will be greater than the volume of supply air reduced by maximizing the flow path resistance under the greatest change in pressure which the car is subjected to.

The above description covers the flow from F15 to F22 in FIG. 9.

Figure 12:
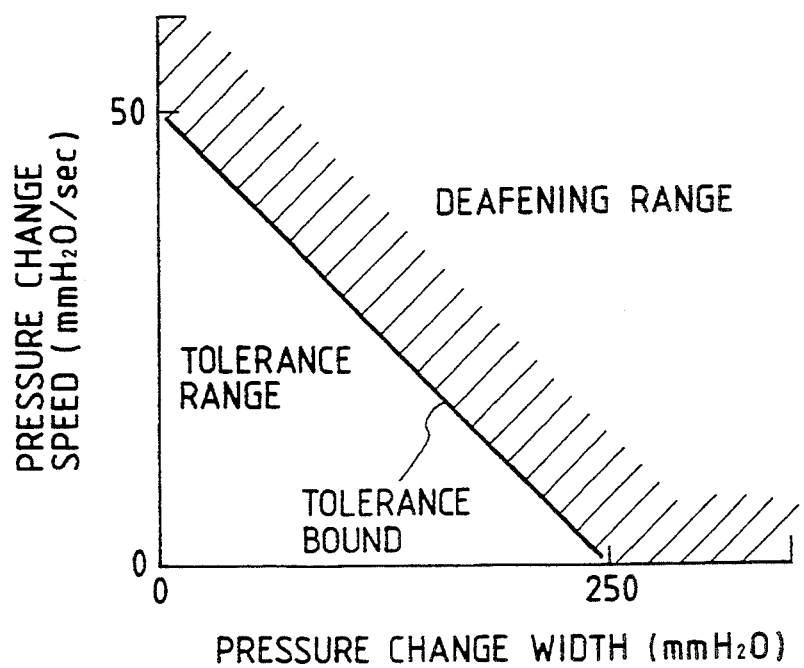
FIG. 12 is a graphical illustration depicting the line of tolerance over which passengers begin to have unpleasant feelings, with a pressure change range plotted on a horizontal axis and a pressure change speed on the vertical axis.

Numerical values of 50 mmH$_2$O, 100 mmH$_2$O and 150mmH$_2$O are control constants to reduce the change in the car internal pressure so that it will not give unpleasant feeling to the passengers, and depend upon how much the car internal pressure is to be reduced. Generally, the boundary of the passengers experiencing unpleasant feeling is determined by the boundary line for unpleasant feeling as shown in FIG. 12, which is obtained from experience. It is known by experience that the pressure change speed can be kept within the tolerance if the range of the car internal pressure is reduced below 150 mmH$_2$O from this diagram. The control target of the car internal pressure is approximately set to within ±150 mmH$_2$O. However, when the car internal pressure is to be reduced still lower, the control constant may be set to a still smaller value.

If the car internal pressure changes to the negative side, the flow path resistance is increased on the exhaust side according to the change in the car internal pressure, as shown in control state F23 to control state F30. If the value is reduced below $-150$ mmH$_2$O, the flow path resistance on the supply side is reduced to $R_2$, as shown in control state F30, so that the volume of supply air will be greater than the volume of exhaust air, thereby causing the car internal pressure to be increased.

After the air feed characteristics of the air supply fan 2 and exhaust fan 3 and the flow pass resistance of flow path resistance changers 6 and 7 have been determined by the above control, the control signal is sent from the controller 13 to the frequency command terminal of inverter 5 and the control valves to switch the extension/retraction of air cylinders 24a and 24b of flow path resistance changers 6 and 7, as shown in the flow chart of FIG. 10.

The air feed characteristics are set to $A_1$ or $A_2$ at this time when the car 1 is traveling outside or inside the tunnel. So if the air feed characteristics need not be changed according to judgment F31, output to the inverter 5 is omitted as shown in control state F32, and an output signal is supplied only to the flow path resistance changers 6 and 7. This control is effected in order to improve the response of the controller 13.

If the air feed characteristics of the air supply fan 2 and exhaust fan 3 must be increased at this time, by detection of the car in the tunnel, the first priority should be given to control output of flow path resistance changers 6 and 7, as shown in control states F35 to F38. After waiting for the time required for the change in the flow path resistance as set on the timer, then the control output is sent to the inverter, and frequency of the power sent to the motor 4 is changed. To reduce the air feed characteristics, a control command output is given in the reverse of the procedure, as shown in control states F39 to F42. This is used, for example in the following case, namely, if the frequency of the inverter 4 is changed first when increasing the air feed characteristics of air supply fan 2 and exhaust fan 3, the volume of water will increase, and the cooling or heating load of the air conditioner will increase, thereby resulting in the temperature in the passenger car undergoing sudden change. This unpleasantness be prevented by measures described above.

In the control states F33, F36 and F42, the time required to change the flow pass resistances of flow path resistance changers 6 and 7 is measured by the timer. In the control states F38 and F40, the time required to change the frequency of the power supplied to the motor 4 is measured by the timer.

Figure 13:
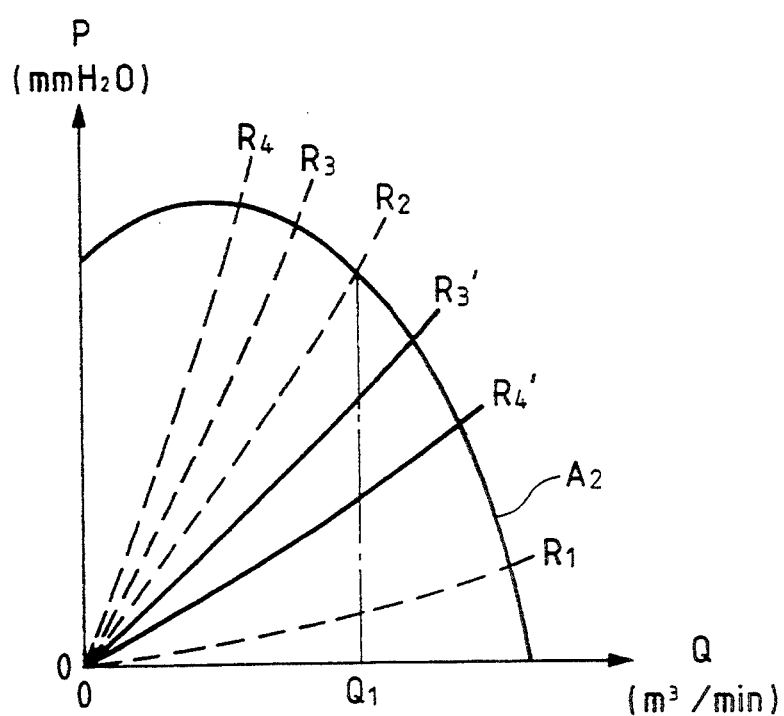
FIG. 13, is a graphical illustration of the air feed volume of the air supply fan and the exhaust fan and the resistance characteristics of the flow path resistance changer of another embodiment of a rolling stock ventilator according to the present invention.

As shown in FIG. 13, different resistance characteristics can be set for the supply side and exhaust side of flow path resistance changers 6 and 7. Namely, as shown in FIG. 11, the car external pressure which the car received within the tunnel is less on the positive side than on the negative, and the negative side occupies a greater portion of the time in a very small period of time. So it is necessary to set the resistance characteristics of flow path resistance changers 6 and 7 to resistance curves $R_3$ and $R_4$ which increases the volume of air, on the air supply side, and to resistance curves $R_2$ and $R_4$ which decreases the volume of air, on the exhaust side. Thus, the imbalance between the volume of supply air and that of exhaust air can further be adjusted in multiple steps by changing the resistance so that the volume of air is increased in the case of flow path resistance changer 6 on the air supply side, and by changing the resistance so that volume of air is decreased in the case of flow path resistance changer 7 on the exhaust side.

Namely, in FIG. 8, the resistance characteristics when the car external pressure has changed to the negative side inside the tunnel can be controlled in three steps in total; two steps of operations to $R_3$ and $R_4$ for flow path resistance changer 7 on the exhaust side, plus one step of operations to $R_1$ for flow path resistance changer 6 on the air supply side, using $R_2$ as a reference; whereas according to embodiment shown in FIG. 13, it can be controlled in five steps in total; two steps of operations to $R_3$ and $R_4$ for the flow path resistance changer 7 on the exhaust side, plus three steps of operations to $R_3'$, $R_4'$ and $R_1$ for the flow path resistance changer 6 on the air supply side. This permits finer control of the car internal pressure by virtue of the increase in the number of air volume control steps.

Figure 14:
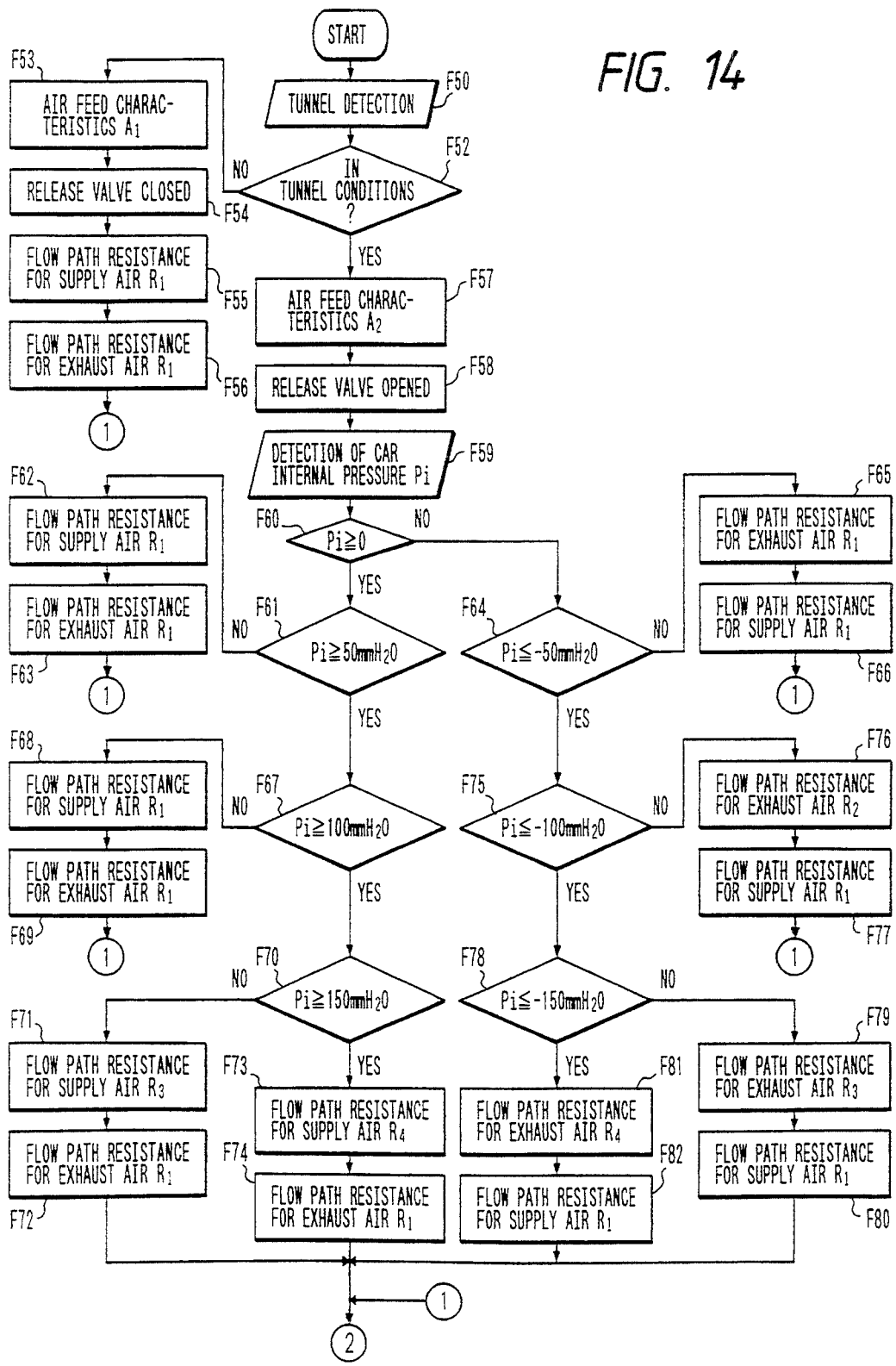
FIG. 14 is a control flow chart depicting the air conditioner operating in a cooling mode of the ventilator.
Figure 15:
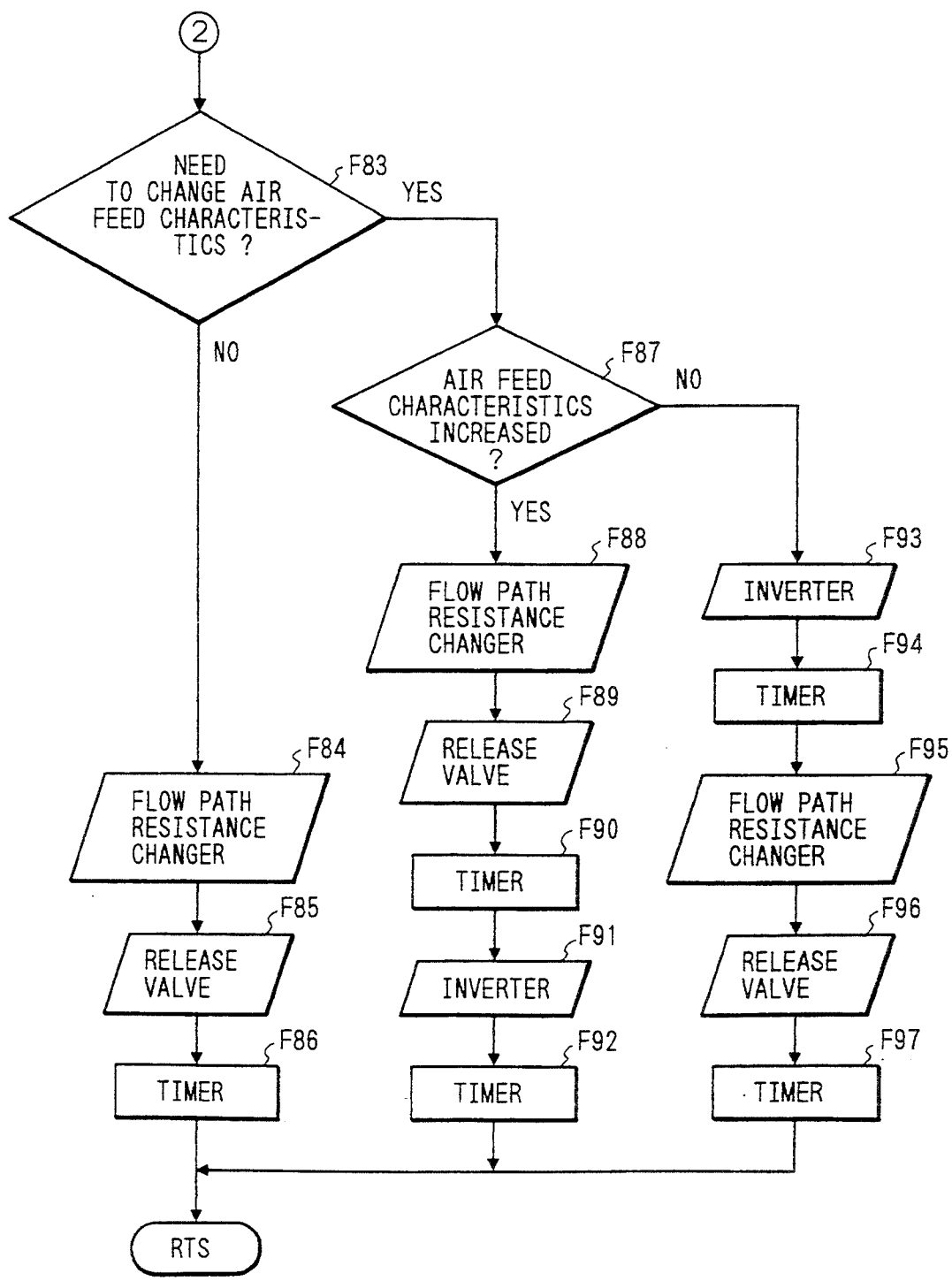
FIG. 15, is a continuation of the flow chart of FIG. 14.

The control state of the ventilator shown FIGS. 14 and 15 during the operation of the air conditioner in the cooling mode is basically the same as that shown in FIGS. 9 and 10. Omitting detailed description for this reason, only the differences will be described with reference to FIGS. 8 and 14. For example, in order to increase the air feed characteristics of air supply fan 2 and exhaust fan 3 to air feed characteristics $A_2$ and to set the volume of air to the rated volume during the operation of the air conditioner in the cooling mode, if the air volume is reduced by setting resistance characteristics of flow path resistance changers 6 and 7 to $R_2$, then the air discharge static pressure of air supply fan 2 and exhaust fan 3 will increase, raising the exhaust air temperature. As a result, the cooling Gr heating load of the condenser will increase, and this will require improvement of the air conditioner capacity, requiring larger equipment to be employed. When the resistance characteristics of flow path resistance changers 6 and 7 are increased to the level of air feed characteristics $A_2$, the release valve 8 of the bypass circuit 55 shown in FIGS. 1 and 2 is opened in order to control the air volume, and part of the volume of supply air (difference between air volumes $Q_2$ and $Q_1$) is bypassed to the exhaust side. At this time, resistance characteristics of the flow path resistance changer are maintained at R1 as shown in F62, F6S, F65 and F66. This control method permits a substantial reduction of the rise in the temperature of exhaust air, eliminating the need of improving the capacity of the air conditioner.

If the car internal pressure has exceeded 50 mmH$_2$O and is changed to the positive pressure side according to judgment 61, the resistance of the flow path resistance changer 6 on the air supply side is increased according to the changing pressure by judgments F67 and F70, as shown in control states F68, F69, and F71 to F74, thereby reducing the volume of the supply air. If the car internal pressure has changed to the negative side with respect to $-50$ mmH$_2$O, the resistance of the flow path resistance changer 7 on the exhaust side is increased according to the changing pressure as shown in control states F76, F77 and G79–82 by judgments F75 and F78, thereby reducing the volume of the exhaust air.

The difference between the control method in FIG. 15 and that in FIG. 10 is that the equipment to be controlled by the controller 13 includes the release valve 8 in addition to the inverter 5 and flow path resistance changers 6 and 7.

The operation commands to the release valve 8 and flow path resistance changers 6 and 7 are given almost at the same time, and the operations of the equipment are timed of the timers in control states F86, F90 and F97.

Figure 16:
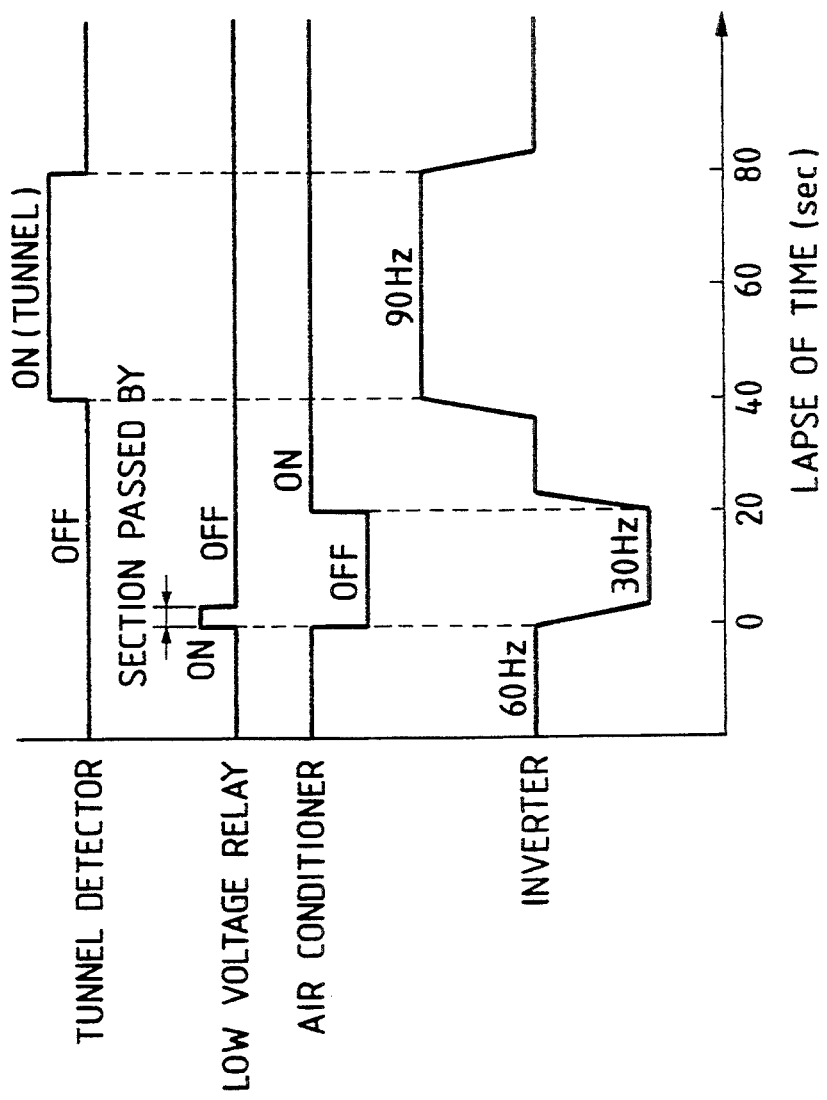
FIG. 16 is a timing chart representing a frequency change of an inverter when a car of the rolling stock is passing through a section and tunnel, constructed in accordance with another embodiment of the present invention.

The following provides more detailed description of said inverter control method according to FIG. 16. The output frequency of inverter 5 to air supply fan 2 and exhaust fan 3 is constant at 60 Hz, for example, while the car 1 is traveling through the tunnel. The frequency is increased to 90 Hz to increase the air feed characteristics when the car 1 is running through the tunnel. When the car 1 has passed by the section which is a switching section of the substation feeding electric power to the electric wiring, the electric power supplied to the car from the wiring is temporarily interrupted. To protect the compressor, the air conditioner detects this temporary power interruption by the low voltage relay 12, and stops the compressor by the time in which the pressures of the freezing cycle are balanced with each other (about 20 seconds normally). During this time, cooling is not performed inside the car, so the temperature inside the car is raised, giving an unpleasant feeling to the passengers. While the air conditioner is stopped after passage of the car 1 through the section, the thermal load due to ventilation should be mitigated. The output of inverter 5 is reduced, for example, to 30 Hz, and the volume of the ventilation air is reduced to Q3 shown in FIG. 8 by setting the air feed characteristics of air supply fan 2 and exhaust fan 3 to A3.

When the car 1 is running through the tunnel, however, even if the low voltage relay 12 has operated, the control described with reference to FIG. 9 is carried out in order to reduce the impact of the change of the car external pressure on the inside of the car, and the inverter is always operated at the high frequency. The low voltage relay to detect the temporary power interruption of the wiring is built into the air conditioner, so it would be effective to ensure shared use of the component parts by using one controller instead of two that is, a controller for controlling the air conditioner operation and the controller to control the ventilator.

Figure 3:
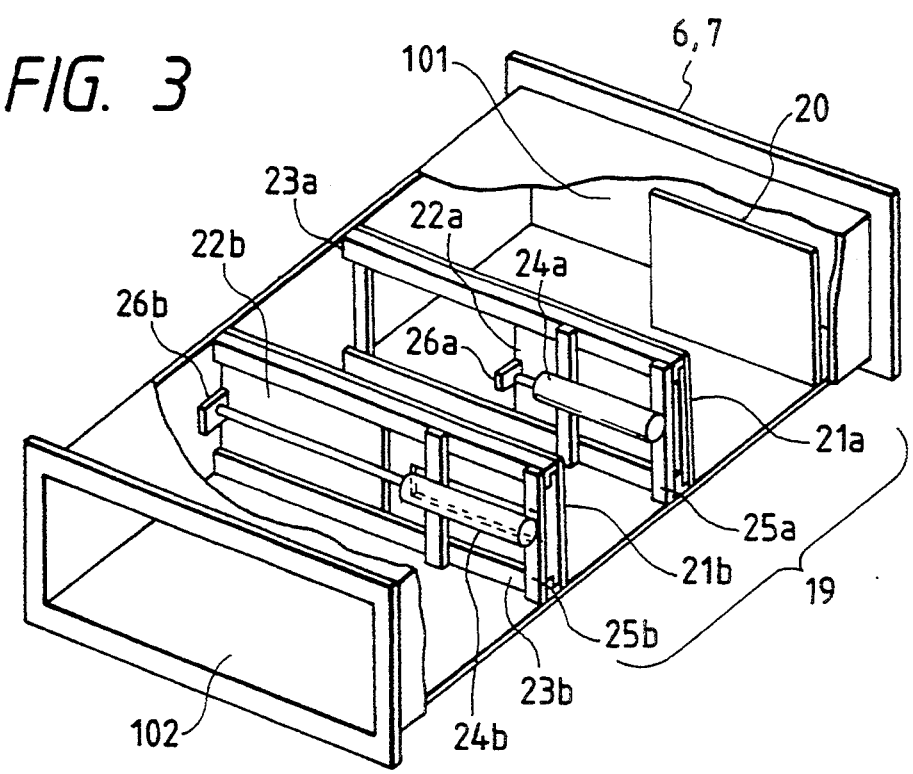
FIG. 3 is a perspective view of a flow path resistance changer constructed in accordance with the present invention.
Figure 17:
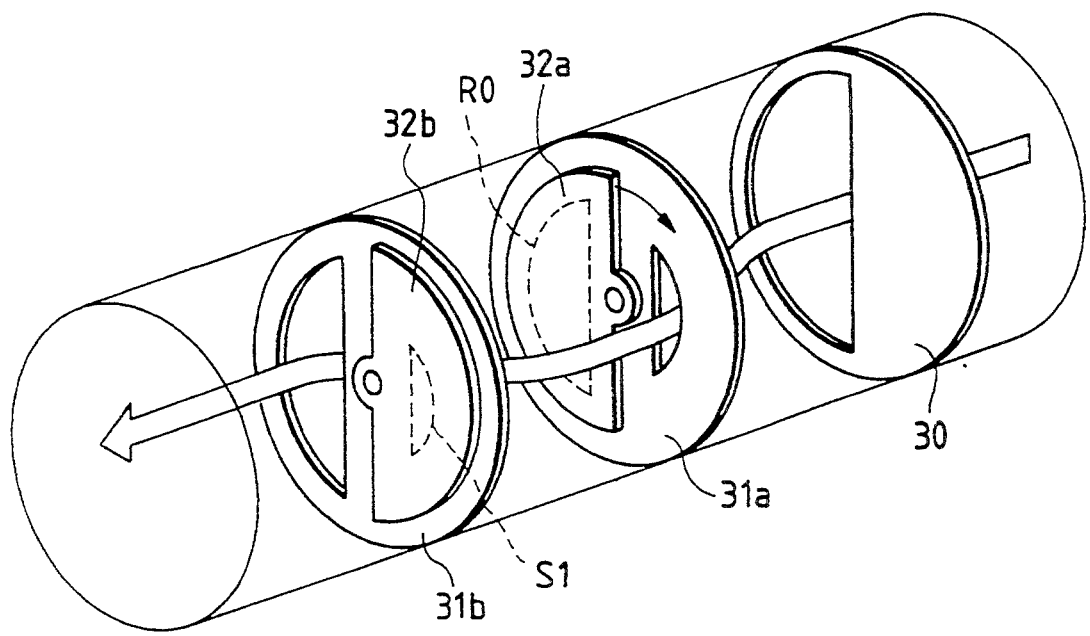
FIGS. 17 and 18 are schematic perspective views of a flow path resistance changer having a different construction from that of the ventilator of FIG. 3.
Figure 18:
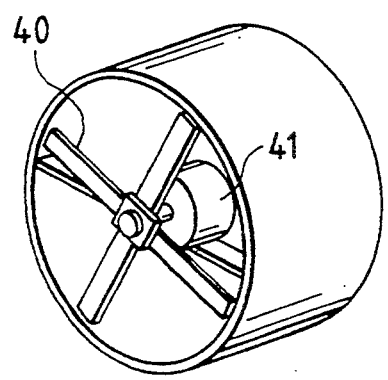

Another construction of the flow path resistance changer will be described according to FIGS. 17 and 18. In the flow path resistance changer given in FIG. 17, selection between two openings (large and small ones) provided on check plates 31a and 31b is made by stopper plates 32a and 33 as required. This is the same control method as in FIG. 3, with the difference residing in the drive structure of stopper plates 32a and 33. In FIG. 3 air cylinders are employed for direct drive; whereas in FIG. 17 actuator (not shown) is provided for enabling rotary movement. If there is any margin of space in the longitudinal direction of the air flow path, this technical approach is advantageous. In FIG. 18 a rotary motor 41 with a flat blade 40 is provided in the air flow path, and changes the resistance against air feed by changing the motor speed with the inverter, with the resistance being greater as the blade speed is increases. This method is effective when the inverter frequency change time is short and the motor follow-up characteristics, with respect to the change, in the car internal pressure are sufficiently high.

Figure 19:
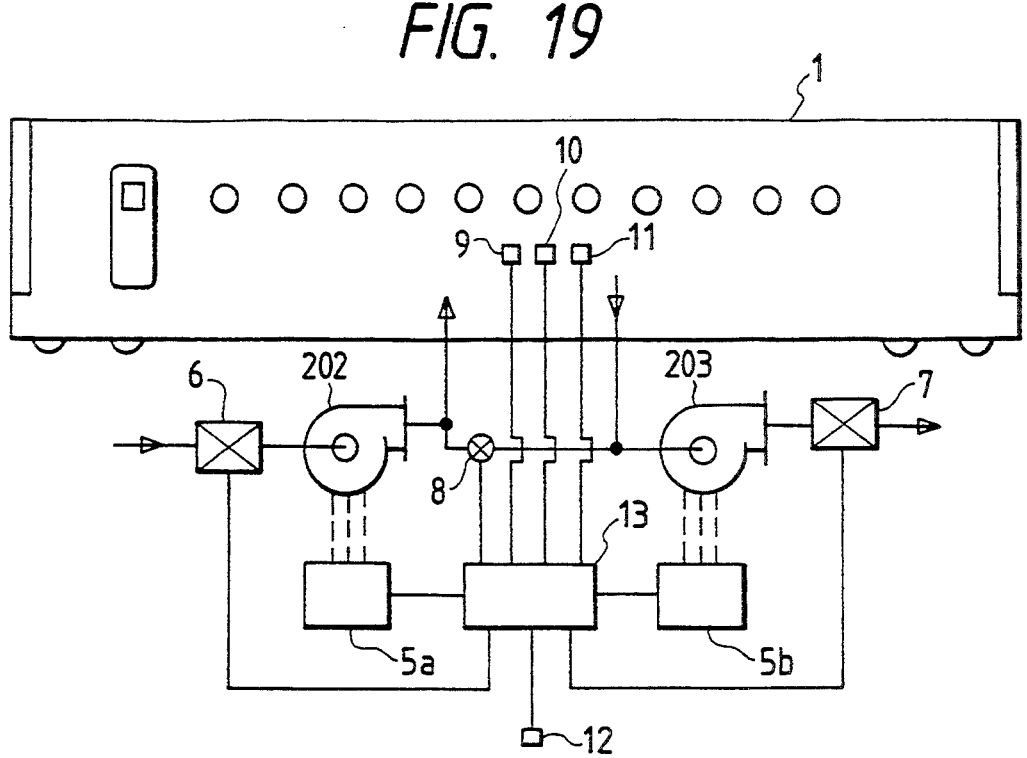
FIG. 19 is a schematic view of another embodiment of a ventilator according to the present invention.
Figure 20:
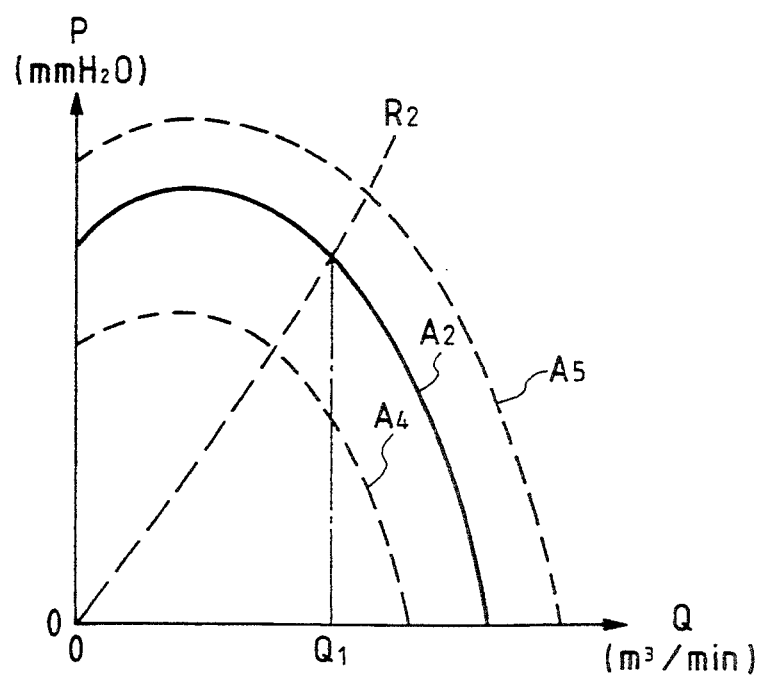
FIG. 20 is a graphical illustration of changes in feed air characteristics due to a frequency change of an air supply fan and exhaust fan and resistance characteristics of the air flow resistance changer of the ventilator of FIG. 19 when the car is in the tunnel.

FIG. 19 illustrates another embodiment of the present invention, where each of air supply fan 202 and exhaust fan 203 is provided with an independent motor (not shown), and each motor is frequency-controlled by each of the inverters 5a and 5b. In the embodiment of FIG. 14, the volumes of supply air and exhaust air are controlled by the flow path resistance changer 6, and change in car internal pressure is mitigated. In addition, it is also possible to control the volumes of supply air and exhaust air by the frequency change of the inverters 5a and 5b, as shown in FIG. 20, and to maintain the change in the car internal pressure within the specified range. Namely, assuming the case where the car external pressure has much changed to the negative side when the car 1 is running through the tunnel, the air volume of air supply fan 202 is reduced, and the air volume for exhaust fan 203 is increased. So the car internal pressure is changed toward the negative side. According to the result of the car internal pressure Pi detected by the car internal pressure detector 10, change is made to the side of increasing frequency on the air supply side, for example, from air feed characteristics A2 to A5. On the other hand, change is made to the side of decreasing frequency on the exhaust side, for example, from air feed characteristics A2 to A4. In this case, since the resistance characteristics are fixed at $R_2$, the car internal pressure is recovered gradually to the atmospheric pressure, even if the volume of supply air is greater than the volume of exhaust air.

Figure 21:
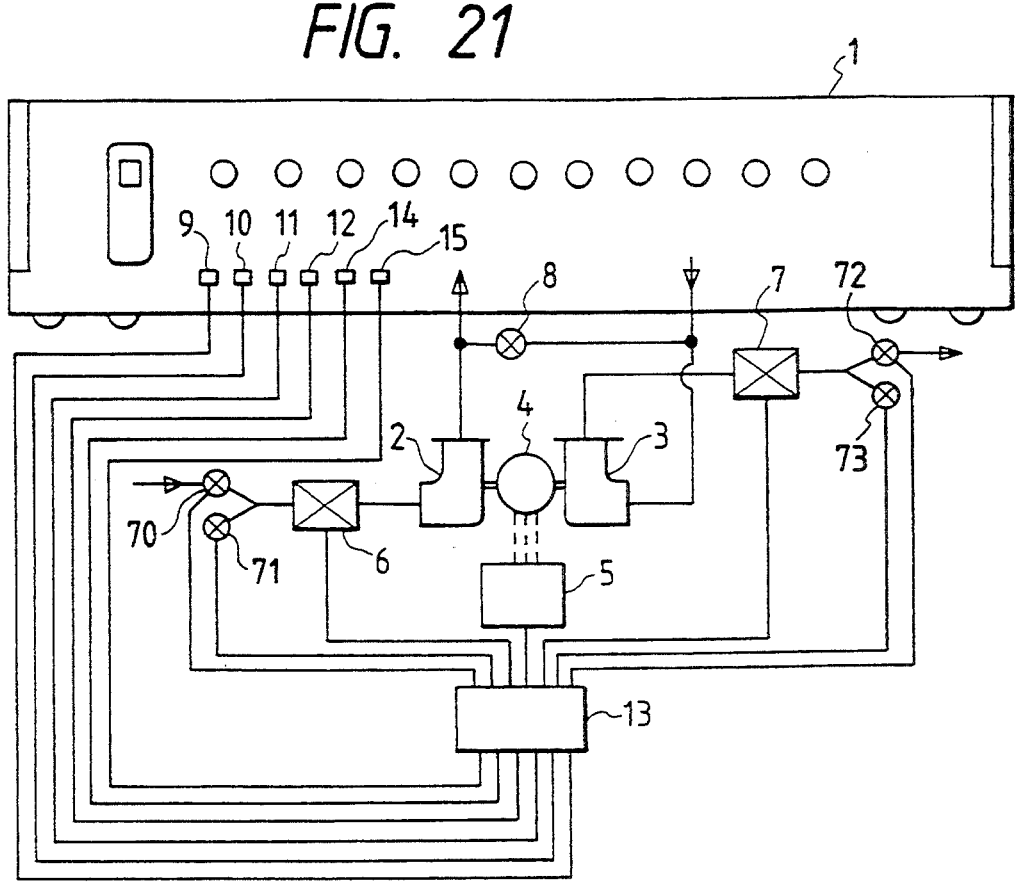
FIG. 21 is a schematic view of the air passage and constituent parts constructed in accordance with another embodiment of a ventilator constructed in accordance with the present invention.

FIG. 21 illustrates still another embodiment of the present invention, wherein the air inlet of ventilator air supply duct 51 and the air outlet of ventilator exhaust duct 54 are provided on both sides below the floor of the car, and the air inlet and air outlet are provided at each of two positions, namely, at the upstream side against the traveling airflow and the downstream side not against the traveling airflow, and cut-off valves 70, 71, 72 and 73 are installed in each duct. The construction according to the embodiment of FIG. 21 is based on the characteristics that the change of pressure inside the tunnel is greater in the negative side than in the positive, and the negative pressure measuring about twice the positive pressure. Traveling direction sensor 14, car external pressure detector 15, and cut-off valves 70, 71, 72 and 73 are added to the construction of FIG. 1. Other composition and control methods of the inverter 5 and flow path resistance changers 6 and 7 are the same as those described herein above.

Figure 22:
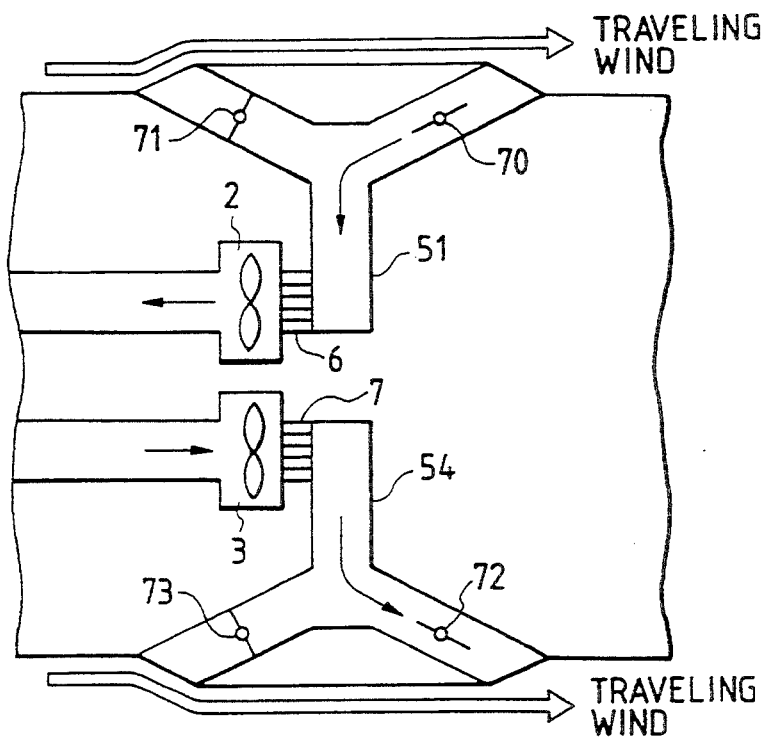
FIG. 22 is a schematic view of a car external air suction duct structure for the air supply fan and the duct of the exhaust fan to discharge air out of the car.

If the car is traveling in the left direction with respect to the plane of the drawing in FIG. 22, and the car external pressure has changed greatly to the negative side in excess of the reference value, then cut-off valves 71 and 73 are opened, while cut-off valves 70 and 72 are closed. Then the dynamic pressure of the traveling wind acts on the air inlet of air supply fan 2, and reduces the change in the pressure at the air inlet, which gives influence to the air feed characteristics of the fan. This results in a substantial mitigation of the reduction in the volume of air to be supplied. The dynamic pressure of the traveling wind also acts on the air outlet of exhaust fan 3, and reduces the pressure change. This results in a substantial mitigation of the increase in the volume of air to be discharged. As a result, the imbalance between the supply air and exhaust air is reduced, and change of the car internal pressure to the negative side is substantially mitigated. Thus, the passengers are not exposed to unpleasant feeling. This results in improved passenger services, ensuring riding comfort.

We claim:

1. A railway rolling stock ventilator comprising:
    an air supply fan for intaking fresh air into a railway car;
    an exhaust fan for discharging air out of the car;
    an air supply control for controlling air feed pressure of said air supply fan and said exhaust fan, wherein said air supply fan and said exhaust fan are adapted to permit change of air supply pressure of said air supply fan and said exhaust fan;
    a tunnel detector for detecting that the car is entering a tunnel and for supplying a control input signal;
    flow path resistance changers installed in an air flow path connected to said air supply fan and said exhaust fan to control an air flow path area of the air flow path, and to change a flow path resistance of the air flow path and;
    a controller for supplying a control signal to said air supply control to raise an air feed pressure of said air supply fan and said exhaust fan in dependence upon the control input signal from said tunnel detector, and to supply said flow path resistance changers a control command to increase the flow path resistance; and
    wherein each flow resistance changer includes flow path restrictions, including check plates and stopper plates disposed in the air flow path, said check plates being arranged so as to interrupt flow of air through the air flow path and being provided with openings, said stopper plates being arranged so as to be movable toward said check plates so as to cover the opening in said check plates, the opening in said check plates including large opening and small openings, said stopper plates being arranged so as to close one of the large and small openings of the respective check plates, said check plates being provided with rotary shafts, said large openings and small openings being disposed around said rotary shaft, said stopper plates being mounted on the rotary shaft so as to rotate thereon, combinations of said check plates and said stopper plates being disposed in the direction of air flowing in the air flow path.

2. A rolling stock ventilator according to claim 1, further comprising a car internal pressure detector for detecting an internal pressure of an interior of the car, and wherein said controller supplies the control command signals to said flow path resistance changers to increase the flow path resistance in proportion to a change in the internal pressure of the car by a control signal supplied by said car internal pressure detector.

3. A rolling stock ventilator according to claim 2, wherein said controller supplies a command signal to said flow path resistance changer, disposed on a supply side, to increase the flow path resistance in proportion to a change in the internal pressure of the car to a positive side by the control signal supplied from said internal pressure detector, and supplies a command signal to said flow path resistance changer, disposed on an exhaust side, to increase the flow path resistance in proportion to the change in the car internal pressure to a negative side by the control signal supplied from said internal pressure detector.

4. A rolling stock ventilator according to one of claims 1 or 2, wherein said flow path resistance changers are disposed inside the air flow path, and wherein a drift plate is provided to change a direction of the air flow.

5. A rolling stock ventilator according to claim 4, wherein said drift plate is disposed inside the air flow path, and said stopper plates are movable toward said drift plate.

6. A rolling stock ventilator according to one of claims 1 or 2, wherein said flow path resistance changer is adapted to interrupt air passing through the air flow path and includes a blade installed to be movable inside the air flow path.

7. A rolling stock ventilator according to one of claims 1 or 2, wherein the air inlet of the air flow path for leading outside air to the air supply fan is disposed so as to facilitate feeding of air into the fan, and an air outlet of the air flow path to discharge air from the exhaust fan to the outside is arranged so as to facilitate feeding of air.

8. A railway rolling stock ventilator according to one of claims 1 or 2, wherein said air supply fan and said exhaust fan are driven by a motor, and said air supply control means includes an inverter for controlling the motor in response to a control command supplied from said controller.

9. A railway rolling stock ventilator according to one of claims 1 or 2, wherein said air supply fan and said exhaust fan are driven by respective motors, and wherein said air feed controller includes two inverters for controlling the respective motors according to a control command supplied from said controller.

10. A rolling stock ventilator comprising:
an air supply fan for intaking fresh air into a railway car;
an exhaust fan for discharging air out of the car;
an air supply control for controlling air feed pressure of said air supply fan and said exhaust fan, wherein said air supply fan and said exhaust fan are adapted to permit change of air supply pressure of said air supply fan and said exhaust fan;
a tunnel detector for detecting that the car is entering a tunnel and for supplying a control input signal;
flow path resistance changers installed in an air flow path connected to said air supply fan and said exhaust fan to change a flow path resistance of the air flow path; and
a controller for supplying a control signal to said air supply control to raise an air feed pressure of said air supply fan and said exhaust fan in dependence upon the control input signal from said tunnel detector, and to supply said flow path resistance changers a control command to increase the flow path resistance;
an air conditioner receiving air from said air supply fan;
an air conditioner operation mode detector for detecting an operation mode of said air conditioner; and
a bypass circuit connecting an air flow path on an exhaust side of said air supply fan and on an air supply side of said exhaust fan, said bypass circuit being provided with a release valve; and
a control rod, responsive to a control input signal from said air conditioner operation mode detector, and
wherein said air conditioner operation mode detector supplies an open control command signal to said release valve when said air conditioner is in a cooling mode, even if the car is running through a tunnel.

11. A rolling stock ventilator according to claim 10, wherein said air supply fan supplies air to said air conditioner, and is provided with a low voltage relay to detect a drop of voltage supplied to said air conditioner, said controller, using a control input signal as resulting from detection by a low voltage detector, sends to the air supply control a control output signal for reducing an air feed pressure of the air supply fan and exhaust fan when the voltage supplied to the air conditioner has dropped.

12. A rolling stock ventilator according to claim 10, wherein said air supply fan and said exhaust fan are driven by a motor, and said air supply control means includes an inverter for controlling the motor in response to a control command supplied from said controller.

13. A rolling stock ventilator according to claim 10, wherein said air supply fan and said exhaust fan are driven by respective motors, and wherein said air feed controller includes two inverters for controlling the respective motors according to a control command supplied from said controller.

* * * * *